(12) United States Patent
Maniscalco et al.

(10) Patent No.: US 6,670,917 B1
(45) Date of Patent: Dec. 30, 2003

(54) BALANCED INTEGRATED POSITION DETERMINATION SYSTEM AND COMMUNICATION SYSTEM

(75) Inventors: Charles Maniscalco, Los Altos, CA (US); Anthony W. Serksnis, San Jose, CA (US); Jack S. Warner, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/693,298

(22) Filed: Oct. 19, 2000

Related U.S. Application Data

(63) Continuation-in-part of application No. 09/388,035, filed on Sep. 1, 1999, now abandoned, which is a continuation of application No. 08/791,190, filed on Jan. 31, 1997, now Pat. No. 6,072,429.

(51) Int. Cl.[7] .............................. G01S 5/02; H04B 7/185
(52) U.S. Cl. ................................ 342/357.17; 342/357.1
(58) Field of Search ...................... 342/357.17, 357.09, 342/357.1

(56) References Cited

U.S. PATENT DOCUMENTS

| | | | |
|---|---|---|---|
| 4,852,931 A | * | 8/1989 | Ferdi .......................... 294/147 |
| 5,474,191 A | * | 12/1995 | Bergeron et al. .......... 211/70.2 |
| 5,512,905 A | * | 4/1996 | Nichols et al. |
| 5,734,348 A | * | 3/1998 | Aoki et al. |

* cited by examiner

Primary Examiner—Theodore M. Blum
(74) Attorney, Agent, or Firm—Wagner, Murabito & Hao LLP

(57) ABSTRACT

An integrated position determination system and communication system is disclosed that includes an antenna and that includes position signal processing circuitry for determining position. The integrated position determination system and communication system also includes a radio for communicating with other position determination systems that is coupled to the position signal processing circuitry and a power supply. The integrated position determination system and communication system also includes a range pole to which the other components of the integrated position determination system and communication system are attached. The components of the integrated position determination system and communication system are located such that the system is both horizontally balanced and vertically balanced. More particularly, the integrated position determination system and communication system is horizontally balanced about the centerline of the range pole and is vertically balanced about a carrying point.

21 Claims, 15 Drawing Sheets

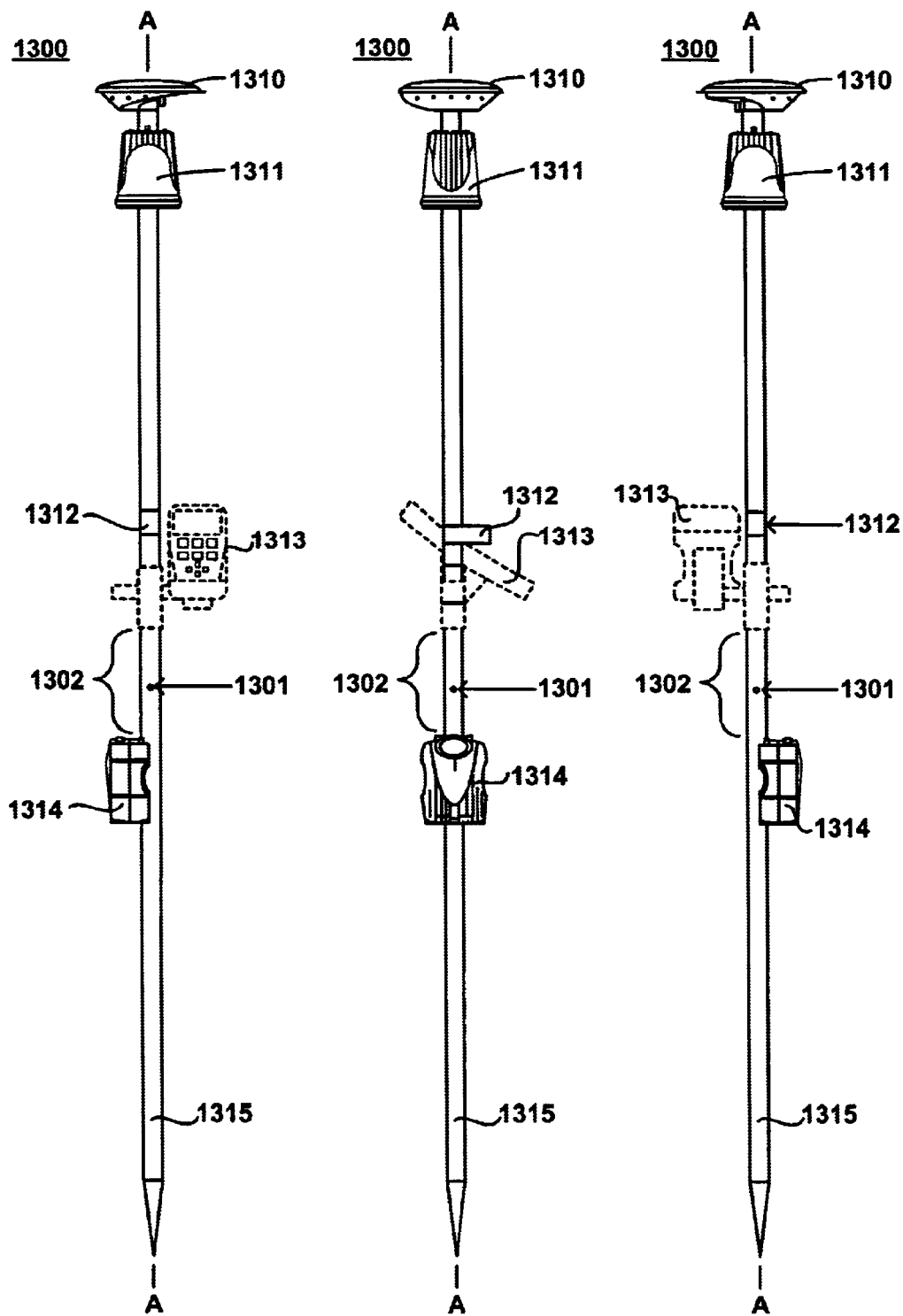
FIG. 15　　FIG. 16　　FIG. 17

BALANCED INTEGRATED POSITION DETERMINATION SYSTEM AND COMMUNICATION SYSTEM

CROSS REFERENCE TO RELATED APPLICATION

This patent application is a Continuation-in-Part of commonly owned U.S. patent application Ser. No. 09/388,035, filed on Sep. 1, 1999 now abandoned entitled "POSITION DETERMINATION SYSTEM AND RADIO IMPLEMENTED ON A POLE," by Crothall et al., which is a Continuation of U.S. patent application Ser. No. 08/791,190, filed on Jan. 31, 1997, now U.S. Pat. No. 6,072,429 by Crothall et al., and entitled "INTEGRATED POSITION DETERMINATION SYSTEM AND RADIO TRANSCEIVER INCORPORATING COMMON COMPONENTS."

TECHNICAL FIELD

The present claimed invention relates to the field of position determination systems. More specifically, the present claimed invention relates to an improved position determination device and radio relay device.

BACKGROUND ART

A typical differential global positioning system (DGPS) network includes a receiver which receives ephemerides data from satellites. Typically, such data is received from global positioning system (GPS) satellites which are a part of the GPS satellite network or satellites which are a part of the Global Navigation Satellite System(GLONASS). The ephemerides data is processed via an electronics package located within the GPS unit. The GPS unit receives differential correction data through a separate radio which is typically connected to the GPS unit by cable. The differential correction data is typically obtained from a radio coupled to a GPS unit which is located at a fixed site which is placed at a known location or it is obtained from other sources and is conveyed via radio. By processing the differential correction data together with the data received at the particular GPS receiver, the location of the GPS unit may be determined within a high degree of accuracy. This same method may be used to perform real time kinematic (RTK) surveys so as to accurately determine the relative position of the GPS system with sub centimeter accuracy.

Prior art GPS devices used in DGPS applications and RTK applications typically require numerous separate, distinct component units which are connected via cables. For example, the GPS receiver and processor would constitute one unit and the terrestrial radio would constitute a second unit which would be coupled to the GPS processor via cable. Typically, an input/output (I/O) unit which includes a display for data monitoring and a keypad for data input is also required. The I/O unit is coupled to the GPS receiver/processor unit and to the terrestrial radio via cable. Some systems also require the attachment of a separate battery via cable. Because multiple separate units are used in these prior art systems, the systems are bulky and they are difficult to move around.

For example, one type of prior art system which is typically referred to as "handheld" includes a GPS antenna, a GPS processor, a display processor, and a display in a single unit. A DGPS radio antenna and receiver are provided in a separate unit or units which are connected to the GPS processor. Another type of prior art system places the GPS antenna in an antenna unit and the display in a separate display unit. The GPS processor and the display processor may be contained in the GPS antenna unit, the display unit, or in a separate unit. A DGPS radio antenna and receiver are provided in a separate unit or units connected to the GPS processor. This format allows the user to separate the GPS antenna and the display units so that the GPS position and time information can be observed and operated upon in a protected environment.

The use of multiple units to house the various components required for prior art DGPS systems, and the requirement for cables and connectors to couple the units creates problems regarding reliability and durability. This is particularly true for DGPS systems which are mobile and which are jarred and shaken by use and movement. In addition, the systems are expensive to manufacture and assemble. Furthermore, the connections are often bulky, expensive and prone to breakage or malfunction. In addition, it is difficult to move the various boxes and cables around.

Typically, the GPS unit receivers are separated by long distances or by immobile structures; therefore, radio relay units are used to get the signal from one GPS unit to anther GPS unit. Prior art radio relay systems for relaying GPS signals typically include multiple separate components such as a transceiver operating at one frequency which is coupled via cable to a separate transceiver operating at a second frequency. These relay systems typically receive signals through an antenna which is cabled to a processor which is then cabled to a radio which rebroadcasts the signal through an antenna attached by cable to the radio. These relay systems are bulky and difficult to move around. Furthermore, these relay systems typically are expensive and are difficult to maintain and operate due to the fact that each of the components of the radio relay system is unique. In addition, most of the currently available systems are not durable and reliable enough for applications such as RTK surveying and operation in harsh environments such as construction sites.

Some recent prior art systems include GPS components that are attached to a range pole. However, in these recent prior art systems, much of the weight is located at or near the top of the range pole. This makes the system difficult to carry around and operate because the system tends to tip over. This can damage the system if it results in the operator dropping the system. At a minimum, this results in operator muscle fatigue because the operator has to constantly fight the system's tendency to tip over.

What is needed is a simple GPS network which is easy to move from place to place and which is durable, reliable, and inexpensive to manufacture and assemble. More specifically, a GPS network which includes a GPS unit, a radio and a radio relay which will reliably operate in difficult environments such as those presented by repeated movement and use in harsh environments such as construction sites is required. Also, a GPS network consisting of components which are easy to operate, use and maintain is required. Moreover, a system is needed that is mounted on a range pole and that does not easily tip over or produce operator muscle fatigue.

DISCLOSURE OF THE INVENTION

The present invention meets the above need with a position determination system which includes a position determination device which can be easily moved and which can be easily and cheaply manufactured and assembled. The above achievement has been accomplished by using a single integrated structure to house the position determination antenna the GPS receiver, a power conditioning system, the position determination processor, and the DGPS radio antenna and DGPS radio circuit board. The position determination device may be easily converted to a radio relay by altering the components located within the housing. The resulting position determination network includes an integrated position determination device and radio relay combination which will reliably operate in difficult environments and which is easy to operate, use and maintain.

A position determination network which includes all of the elements required for DGPS position determination and RTK is disclosed. The network includes a position determination device which holds all of the components necessary for position determination and RTK using DGPS techniques within a single housing. Though the position determination system may be operated using any of a number of different sources of telemetry signals such as GLONASS and the like, the positioning system will be herein described with reference to the use of GPS satellites for purposes of clarity. The GPS satellites include information on the ephemerides of each GPS satellite, parameters identifying the particular GPS satellite, and corrections for ionospheric signal propagation delays. A useful discussion of the GPS and techniques for obtaining position information from the satellite signals is found in Tom Logsdon, *The Navstar Global Positioning System*, Van Nostrand Reinhold, 1992, pp. 17–90, incorporated by reference herein. Reference to a Global Positioning System or GPS herein refers to a Global Positioning System, to a GLONASS system, and to any other compatible satellite based system that provides information by which an observers position and/or the time of observation can be determined. Further information regarding GPS position determination is contained in U.S. Pat. No. 5,519,620 by Nicholas Talbot et al. entitled CENTIMETER ACCURATE GLOBAL POSITION SYSTEM RECEIVER FOR ON-THE-FLY REAL TIME KINEMATIC MEASUREMENT AND CONTROL which is incorporated herein by reference.

The term "DGPS" as used herein and "DGPS radiowave" signal as used herein includes electromagnetic signals containing GPS differential correction information transmitted by other GPS units and/or systems, by the Coast Guard DGPS network, by radio beacon signals, by FM subcarrier signals, by digital subcarrier on an analog two-way radio, by digital radio signals, by cellular telephone signals, by digital cellular telephone signals, by private and semi private network signals that use terrestrial and/or satellite apparatus for transmitting DGPS signals for correction of the GPS location and/or time information.

A first embodiment includes a GPS antenna, GPS/DGPS processing circuitry, a radio and a radio antenna. A power supply battery is placed into a cylindrical pole which is attached to the bottom of the housing so as to form a complete, portable, self-contained GPS system. A display panel includes an on/off switch and lighted indicators. A separate display unit is coupled to the GPS unit for display of position information. Communication between the display unit and the GPS unit may be by cable, communication link, or infrared methods. The separate display unit contains its own power source. However, in one embodiment, the display unit is powered by the GPS unit through the GPS unit's power supply.

A second embodiment is disclosed in which a tripod base instead of a pole is mounted to the housing. The tripod base includes a location mechanism which is used to precisely locate the GPS system with respect to a monument. The location mechanism may be a prismatic optical finder, a laser optical finder, a fixed height tripod, or a laser finder implemented in a tripod with a fourth leg. The tripod base includes a battery pack mounted on or within the tripod. This second embodiment may be used to precisely align a GPS system over a given reference point such as an United States Geological Survey (USGS) site. This allows for easy precise location of a GPS system. The housing and all of the components within the housing are the same as those disclosed in the first embodiment. Thus, the parts are interchangeable. This allows for economies of scale in manufacturing, easy assembly and maintenance, and allows for flexible use of the position determination network components in multiple applications.

In a third embodiment a radio relay unit is disclosed which uses many of the same components as do the first two embodiments. The radio relay unit includes a radio antenna, radio processing circuitry, and a power supply. A transceiver may be installed into the radio relay unit for transmitting and receiving DGPS correction information at the same frequency, or at a different frequency. DGPS correction information may be transmitted either from a second GPS unit or from other sources. This correction data may then be received directly by a GPS unit. Alternatively, the correction data may be received by a radio relay unit which then rebroadcasts the correction information. A GPS unit then receives the rebroadcast correction information on the radio contained within the GPS unit. Alternatively, multiple relay units may be used to transmit correction information over larger distances. Since the radio relay unit uses many of the same components used in the GPS unit, components between the first two embodiments and the third embodiment may be used interchangeably. In addition, the batteries, poles and tripods may be used interchangeably depending on the requirements of a particular project.

A position determination network which includes both the first, the second, and the third embodiments of the present invention is also disclosed. In this network a first GPS system consisting of a GPS unit mounted on a tripod is used as a base station and is located over a known location using the finder located in the tripod. A radio relay system composed of a radio relay unit mounted on a tripod is located within radio range from the first GPS system. A second radio relay system is placed near the site where locations are to be determined. Additional radio relays may be used to extend the range even further. A GPS system including a GPS unit mounted on a pole is then used to pinpoint the desired geographic location or locations.

Since the GPS antenna, GPS radio circuitry, GPS and DGPS processing circuitry, power conditioning system, radio, and radio antenna are integrated into a single housing, a GPS system which is easy to move, easy to use, and easy to assemble and disassemble is obtained. In addition, a more durable and reliable GPS unit results due to the shielding and protection of the various components resulting from the integration of the various components into a single housing. Since many of the components are common to both the GPS system and the radio relay system, the position determination network allows for inexpensive manufacturing of the required components. The GPS system and the radio relay system are easy to assemble and easy to repair due to the usage of a common assembly scheme and due to the use of common components. In addition, due to the design of the system and since a single housing is used, the GPS system and the radio relay system are more reliable and durable than the multiple cable connected units found in prior art systems.

In one embodiment, an integrated position determination system and communication system is described that includes a range pole and in which the various components are coupled to the range pole such that the system is both horizontally and vertically balanced. Because the system is both horizontally and vertically balanced, when a user grips the range pole, there is no tendency for the system to tip over. This prevents potential damage to the system from the system falling over and minimizes or eliminates muscle fatigue as typically occur with prior art systems.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 15 is a right side elevational view of a balanced integrated position determination system and communication system in accordance with the present invention.

FIG. 16 is a front elevational view of a balanced integrated position determination system and communication system in accordance with the present invention.

FIG. 17 is a left side elevational view of a balanced integrated position determination system and communication system in accordance with the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
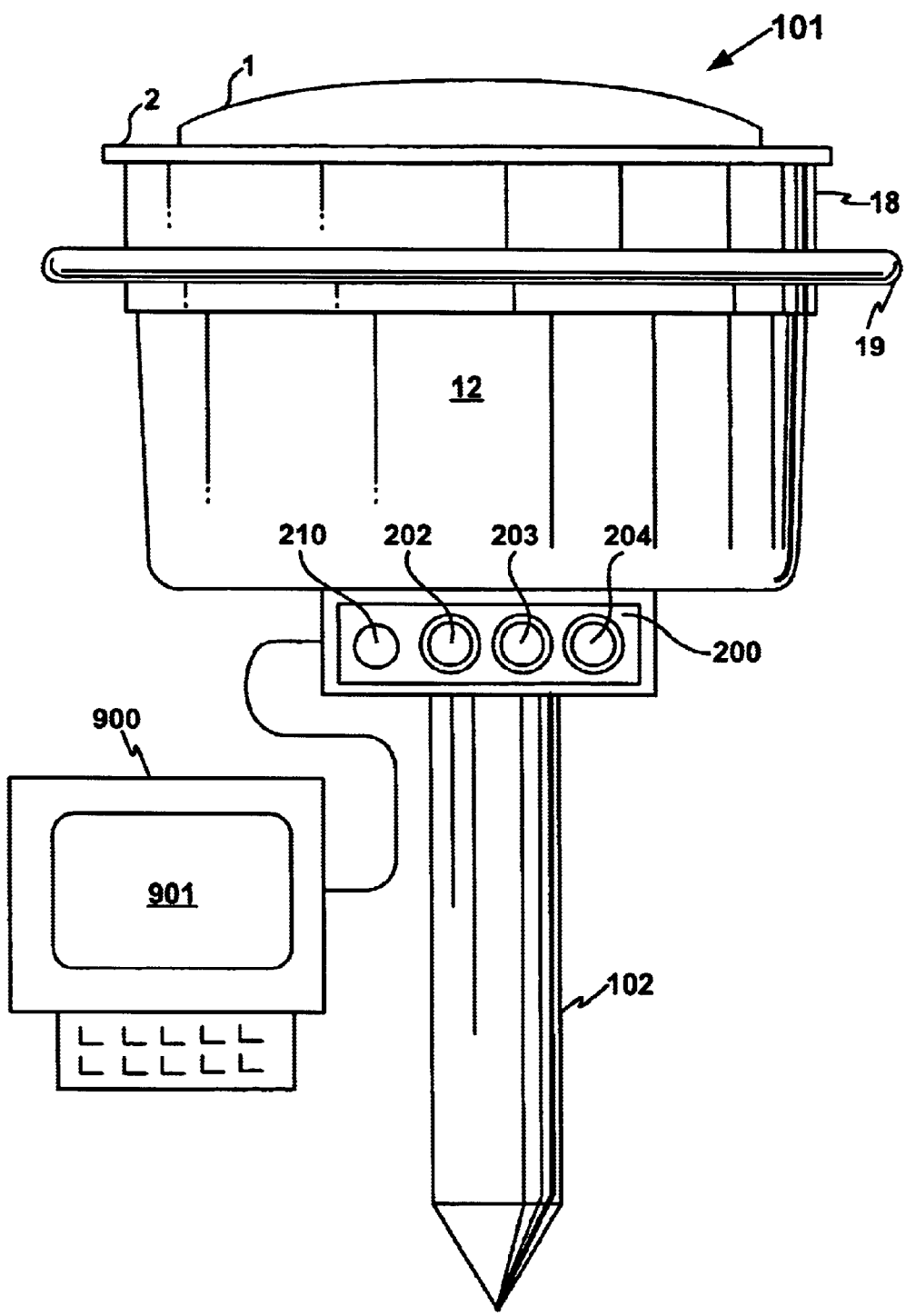
FIG. 1 is a perspective view of an integrated GPS and radio relay system in accordance with the present invention.

FIG. 1 shows GPS system which includes GPS unit 101 which is mounted onto pole 102. GPS unit 101 includes housing 12 which mates with low noise amplifier housing 4(not shown) and radome 1 to enclose the various internal components of GPS unit 101. Bumper ring 18 and bumper 19 absorb shock from dropping or moving GPS unit 101. Pole 102, along with GPS unit 101 forms a single integral GPS system which can be easily moved from place to place. All of the electronics for location determination using DGPS correction information are located within the GPS unit 101 and pole 102. Display panel 200 includes lighted indicator 202, lighted indicator 203 and lighted indicator 204 and on/off switch 201. Lighted indicators 202–204 indicate conditions such as, for example, "power on," "radio operational," and "receiving correction data." Display panel 200 could include any of a number of other configurations and could include indications of signal strength, accuracy, communication quality, etc. In addition, display panel 200 may indicate satellite lock. A separate display unit 900 including display 901 is coupled to GPS unit 101 for display of location and correction data.

Figure 2:
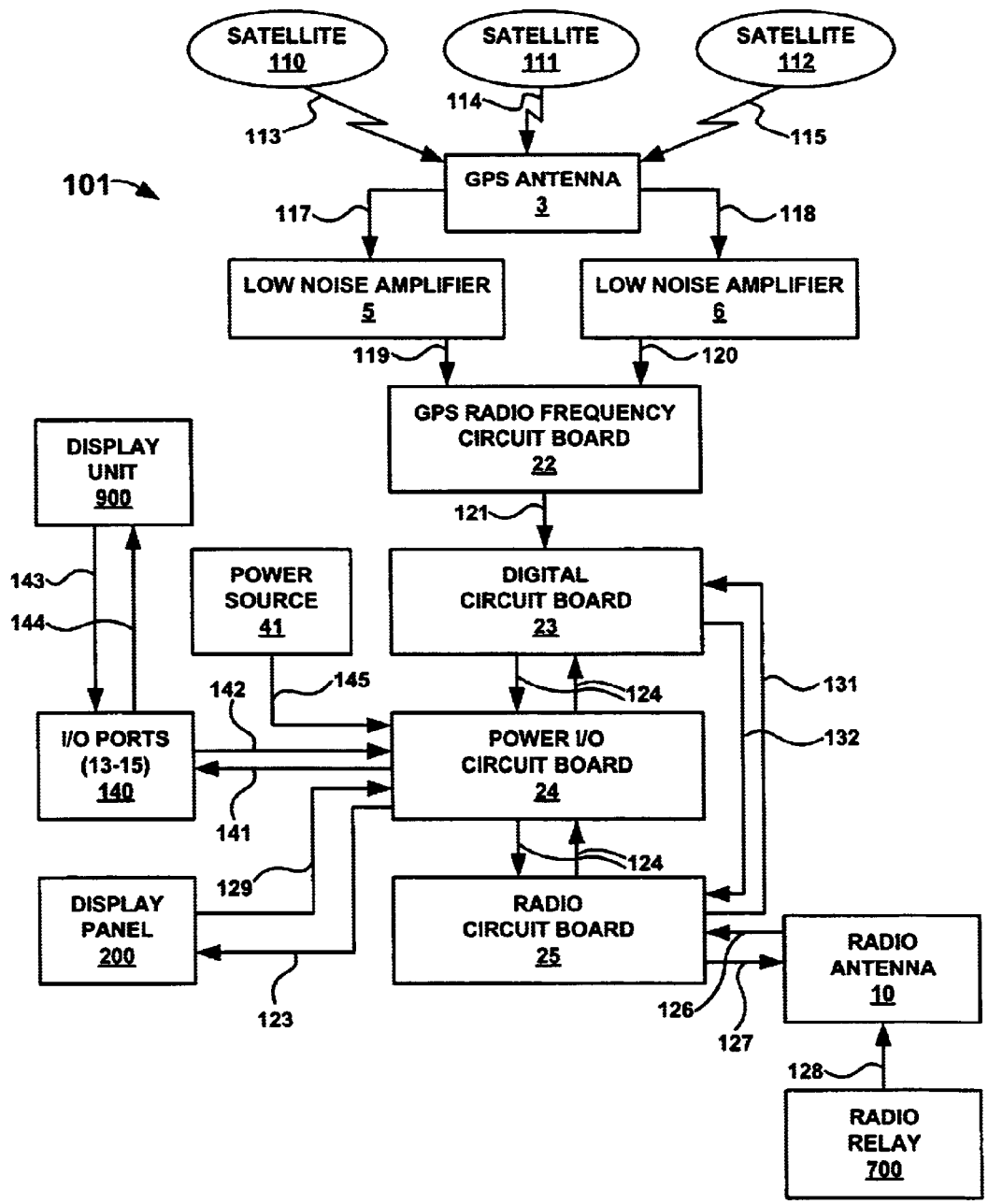
FIG. 2 is a diagram of a integrated GPS and radio relay system in accordance with the present invention.

FIG. 2 shows GPS antenna 3 to receive ephemerides from satellite 110, satellite 111 and satellite 112 as shown by arrows 113–115. Antenna 3 receives ephemerides on two separate frequencies so as to obtain two sets of signals or "channels." One set of signals is transmitted to low noise amplifier 5 as illustrated by arrow 117 and the other set of signals is transmitted to low noise amplifier 6 as shown by arrow 118. Electrical signals are amplified by low noise amplifier 5 and the resulting signal is transmitted to GPS radio frequency circuit board 22 as shown by arrow 119. Similarly, low noise amplifier 6 amplifies the incoming signals and transmits them to GPS radio frequency circuit board 22 as indicated by arrow 120. GPS radio frequency circuit board 22 contains radio reception and transmission circuitry which then transmits the signals as shown by arrow 121 to digital circuit board 23. Digital circuit board 23 contains logic for processing GPS ephemerides and correction information so as to determine the exact position of the GPS system. Radio antenna 10 receives radio broadcasts as illustrated by arrow 128 which contains DGPS error correction information from radio relay 700 which is transmitted to radio circuit board 25, as shown by arrow 126. However, error correction information may be received from any of a number of other sources. Radio circuit board 25 includes electronic circuits for broadcasting and receiving radio signals. Radio circuit board 25 processes the signal and transmits the signal to digital circuit board 23 as shown by arrow 131. Using the error correction data in combination with the ephemerides received from satellites 110–112, digital circuit board 23 calculates the position with greatly increased accuracy. In one embodiment, error correction data includes calculated pseudoranges. In a RTK system, error correction data includes carrier phase data and pseudoranges. The position may then be displayed on display unit 900.

Continuing with FIG. 2, when GPS unit 101 is used to determine error correction, digital circuit board 23 determines the correction information using known location information. The known location information may be input using display unit 900. The correction information is then sent, as shown by arrow 132 to radio circuit board 25(connectors attached to power and I/O circuit board 24 route the signal directly). Radio circuit board 25 then broadcasts the correction information through radio antenna 10 as shown by arrow 127. Radio signals are sent and received at a frequency of 2.44 GigaHertz. However, any of a number of other frequencies could be used.

Continuing with FIG. 2, power I/O circuit board 24 contains electronic circuitry for power management and transfer functions and regulates power to other components. Power I/O circuit board 24 is coupled to battery 41 as shown by arrow 145 and provides power and power management functions for the electronic components GPS unit 101. Power I/O circuit board is directly coupled to radio circuit board 25 and digital circuit board 23 as shown by arrows 124. An on/off switch on display panel 200 is connected to power I/O circuit board as shown by arrow 129 such that, by engaging the on/off switch, the GPS unit may be turned on and off. Input and output to external devices is coupled through I/O ports 13–15 as shown by box 140 and arrows 141 and 142. Display unit 900 is coupled to GPS unit 101 through I/O ports 13–15 as shown by arrows 143–144.

Figure 3:
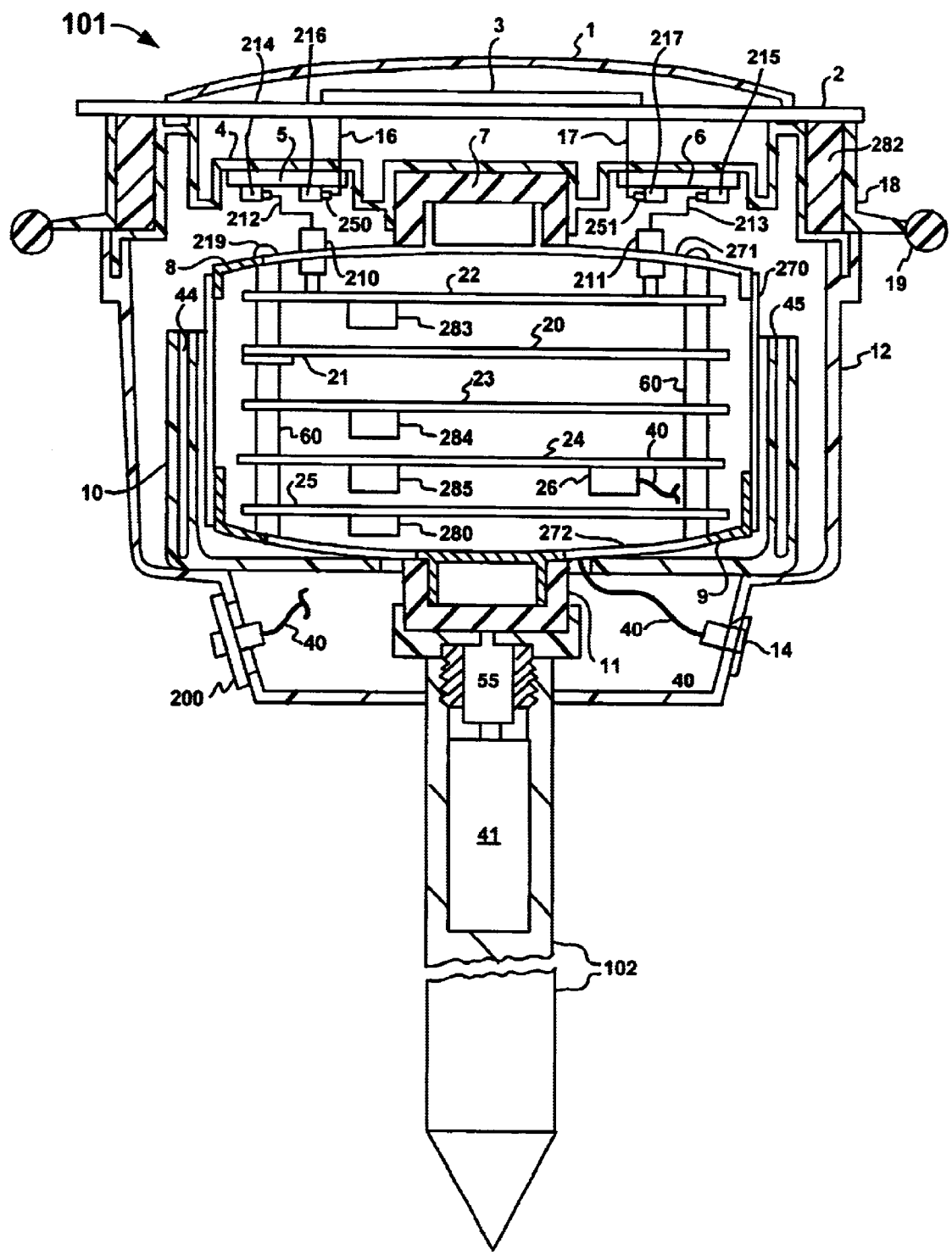
FIG. 3 is a cut away side-sectional view of the integrated GPS and radio relay system of FIG. 1 in accordance with the present invention.

FIG. 3 shows GPS antenna 3 to be mounted onto ground plane 2. Ground plane 2 lies over low noise amplifier housing 4 and is enclosed by radome 1. Low noise amplifier housing 4 fits into housing 12. Upper magnesium housing 8 is secured by flexible bumper 7 to low noise amplifier housing 4. Insulating ring 282 fills the space between bumper ring 18 and low noise amplifier housing 4 and absorbs shock from bumper ring 18. Bumper 19 is molded to bumper ring 18 and is a soft plastic material for absorbing shock and vibration. GPS antenna 3 is coupled to low noise amplifier 5 by semi-rigid coaxial cable 16 which couples to connector 250. Connector 250 couples to receptacle 216 which is attached to low noise amplifier 5. Similarly, semi-rigid coaxial cable 17 extends from GPS antenna 3 to connector 251. Connector 251 mates with receptacle 217 which is attached to low noise amplifier 6. Low noise amplifier 5 and low noise amplifier 6 are small circuit boards which attached to low noise amplifier housing 4 and which amplify portions of the GPS signal separately. Low noise amplifier housing 4 is formed of plastic and the bottom side of low noise amplifier housing 4 is coated with copper to create an electromagnetic interference (EMI) and radio frequency interference(RFI) enclosure so as to shield EMI and RFI emissions from and to low noise amplifiers 5–6. Connector 214 attaches to the bottom of low noise amplifier 5 and couples cable 212 to bulkhead connector 210. Bulkhead connector 210 engages a connector receptacle on GPS radio frequency circuit board 22 so as to electrically connect low noise amplifier 5 to GPS radio frequency circuit board 22. Connector 215 attaches to a connector receptacle attached to the bottom of low noise amplifier 6 and couples cable 213 to bulkhead connector 211. Bulkhead connector 211 engages a connector receptacle on GPS radio frequency circuit board 22 so as to electrically connect low noise amplifier 5 to GPS radio frequency circuit board 22.

Continuing with FIG. 3, antenna 10 includes a parallel feed network which feeds patch antennas 44–51 (46–51 are not shown). Flexible bumper 11 supports lower magnesium housing 9 which mates with upper magnesium housing 8 so as to enclose digital circuit board 23, power I/O circuit board 24, radio circuit board 25, GPS radio frequency circuit board 22 and ring 21. Lower magnesium housing 8 and upper magnesium housing 9 are made of a magnesium which shields RFI and EMI emissions. In order to decrease weight, lower magnesium housing 9 and upper magnesium housing 8 do not completely enclose the top and bottom of the enclosure which they form. Metallic cloth 272 is attached, using adhesive to lower magnesium housing 9 and metallic cloth 271 is attached, using adhesive strips to upper magnesium housing 8. Metallic cloth strip 270 attaches to both lower magnesium housing 9 and upper magnesium housing 10 so as to form the sides of the enclosure. Metallic cloth 271 and metallic cloth 272 and metallic cloth strip 270 may be made of a metallic cloth such as a nickel plated polyester . Connector 26 which mates with a connector receptacle located on power I/O circuit board 24 connects the circuit boards 22–25 to I/O port 13 (not shown), I/O port 14, and I/O port 15 (not shown), display panel 200 and power source coupling 55 through cable 40. Antenna 10 includes a connector receptacle which directly couples to connector 280 which mates with a connector receptacle located on radio circuit board 25 so as to connect radio circuit board 25 with antenna 10. Power source coupling 55 electrically connects with battery 41 to provide power to GPS unit 101. Provision for connectivity of additional components and units is obtained by I/O ports 13–15 which allow for additional components to be coupled to the GPS system such as display and input units and alternate power sources.

Figure 4:
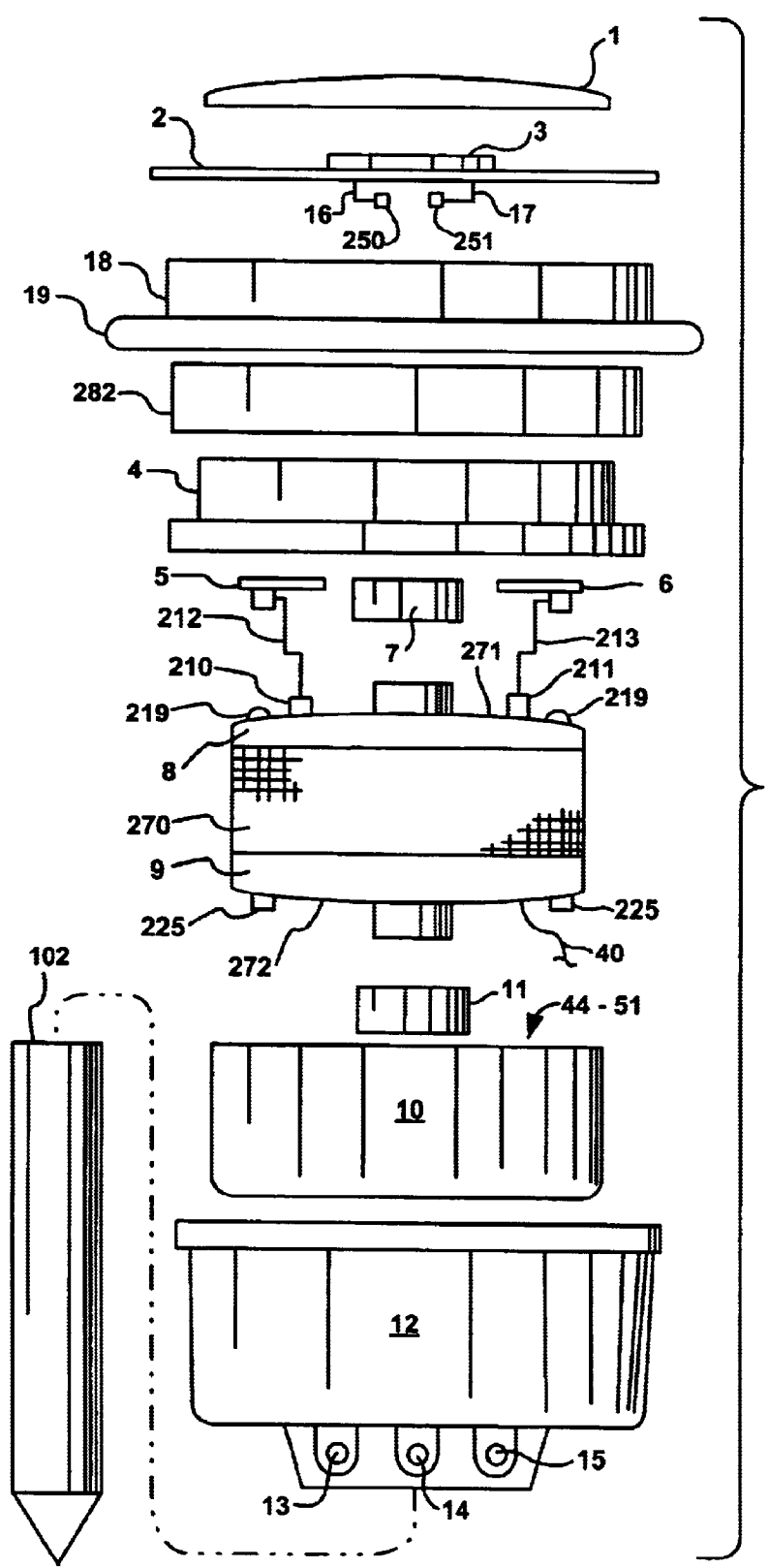
FIG. 4 is an exploded view of a integrated GPS and radio relay system in accordance with the present invention.

FIG. 4 shows housing 12 to include openings into which connector receptacles are disposed so as to form I/O ports 13–15. Antenna 10 includes an omnidirectional parallel fed array of patch antennas 44–51. It can be seen that lower magnesium housing 9 fits within bumper 11 and upper magnesium housing 8 fits within bumper 7 so as to shield the electronics within the enclosure formed by lower magnesium housing 9, upper magnesium housing 8, and magnetic cloth 270–272 from shock and vibration. Bumper ring 18 which is connected to bumper 19 dampens shock to GPS unit 101. Bumper 19 and bumper ring 18 are particularly effective when GPS unit 101 is dropped as bumper 19 is likely to be the first part of GPS unit 101 to strike the ground. For example, vibrations resulting from such contact would be absorbed first by bumper 19 and any excess shock would be channeled through bumper ring 18 and absorbed by insulating ring 282. Insulating ring 282 is made of a closed cell elastomeric foam such as Poron.

Continuing with FIG. 4, since lower magnesium housing 9, upper magnesium housing 8, and magnetic cloth 270–272 are made of material which reduces RFI and EMI emission, the enclosure which they form acts as a RFI and EMI shield. The use of bulkhead connectors 210–211 eliminates the need to have openings in upper magnesium housing 8 for cables to couple low noise amplifiers 5–6 to GPS radio frequency circuit board 22; thereby increasing the shielding effect. Bolts 19 extend through upper magnesium housing 8 and lower magnesium housing 9 and mate with nuts 25 so as to secure upper magnesium housing 8 to lower magnesium housing 9.

Figure 5:
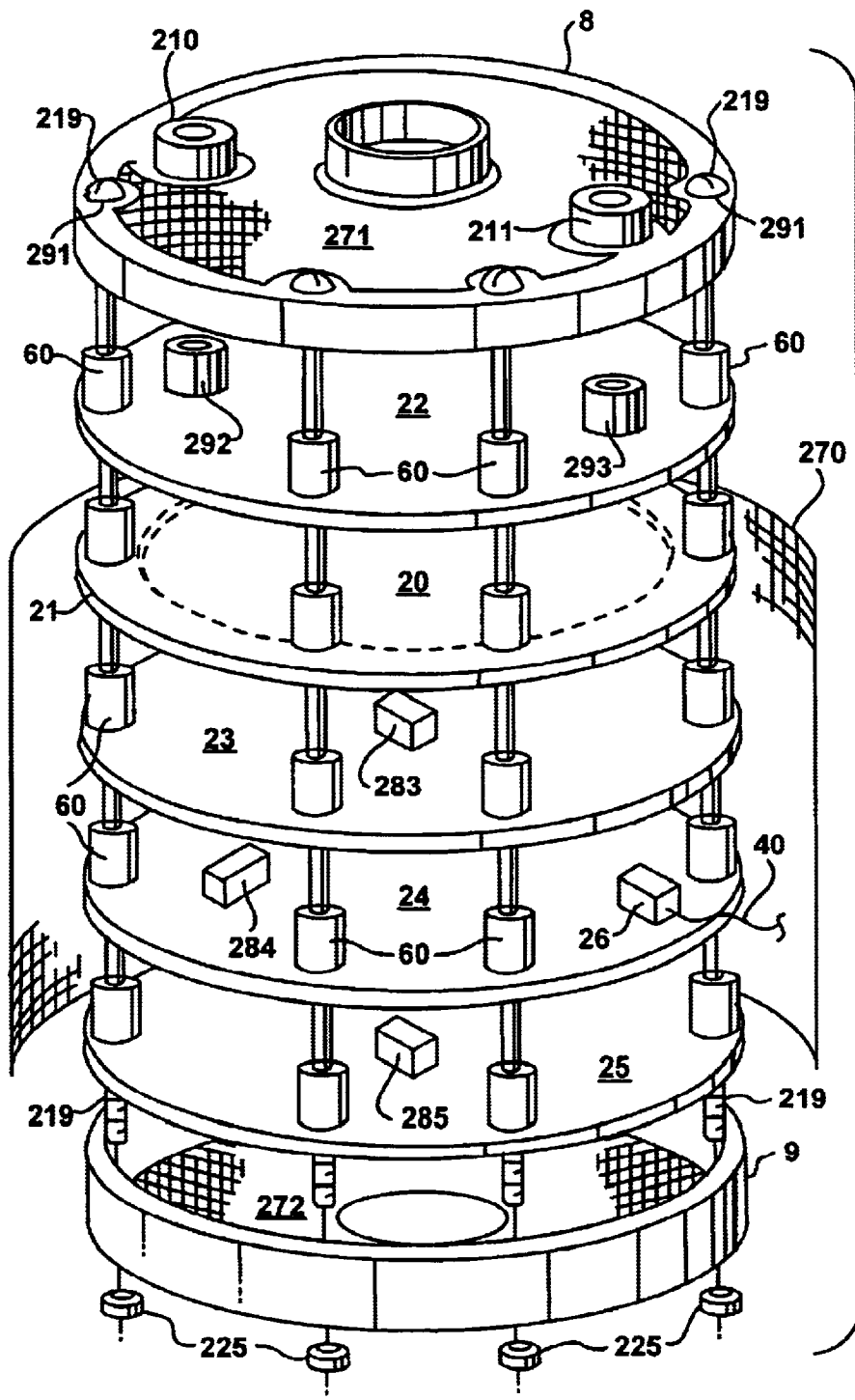
FIG. 5 is a expanded view illustrating a magnesium housing and the components located within the magnesium housing in accordance with the present invention.

FIG. 5 shows power I/O circuit board 24 and digital circuit board 23 and radio circuit board 25 and GPS radio frequency board 22 to be located between upper magnesium housing 8 and lower magnesium housing 9. Connector 26 which is electrically coupled to cable 40 connects directly to a connector receptacle attached to power I/O circuit board 24. Connector 283 mates with a corresponding connector receptacles so as to electrically connect GPS radio frequency circuit board 22 to digital circuit board 23. Connector 284 mates with a corresponding connector receptacles so as to electrically connect power I/O circuit board 24 to digital circuit board 23. Connector 285 mates with a corresponding connector receptacles so as to electrically connect radio circuit board 25 to power I/O circuit board 24. Bolts 219 engage openings 291 in upper magnesium housing 8 and pass through openings in spacers 60 and through threaded openings in bottom magnesium housing so as to secure circuit boards 22–25 within upper magnesium housing 8 and lower magnesium housing 9. Nuts 225 engage each of screws 219. Ring 21 to which polyester sheet 20 is attached supports GPS radio frequency circuit board 22 on top of polyester sheet 20 so as to separate GPS radio frequency circuit board 22 from the other circuit boards 23–25 so as to limit interference from EMI from radio frequency circuit board 25 and power I/O circuit board 24. Spacers 60 which may be stainless steel PEM spacers support and separate circuit boards 22–25.

Figure 6:
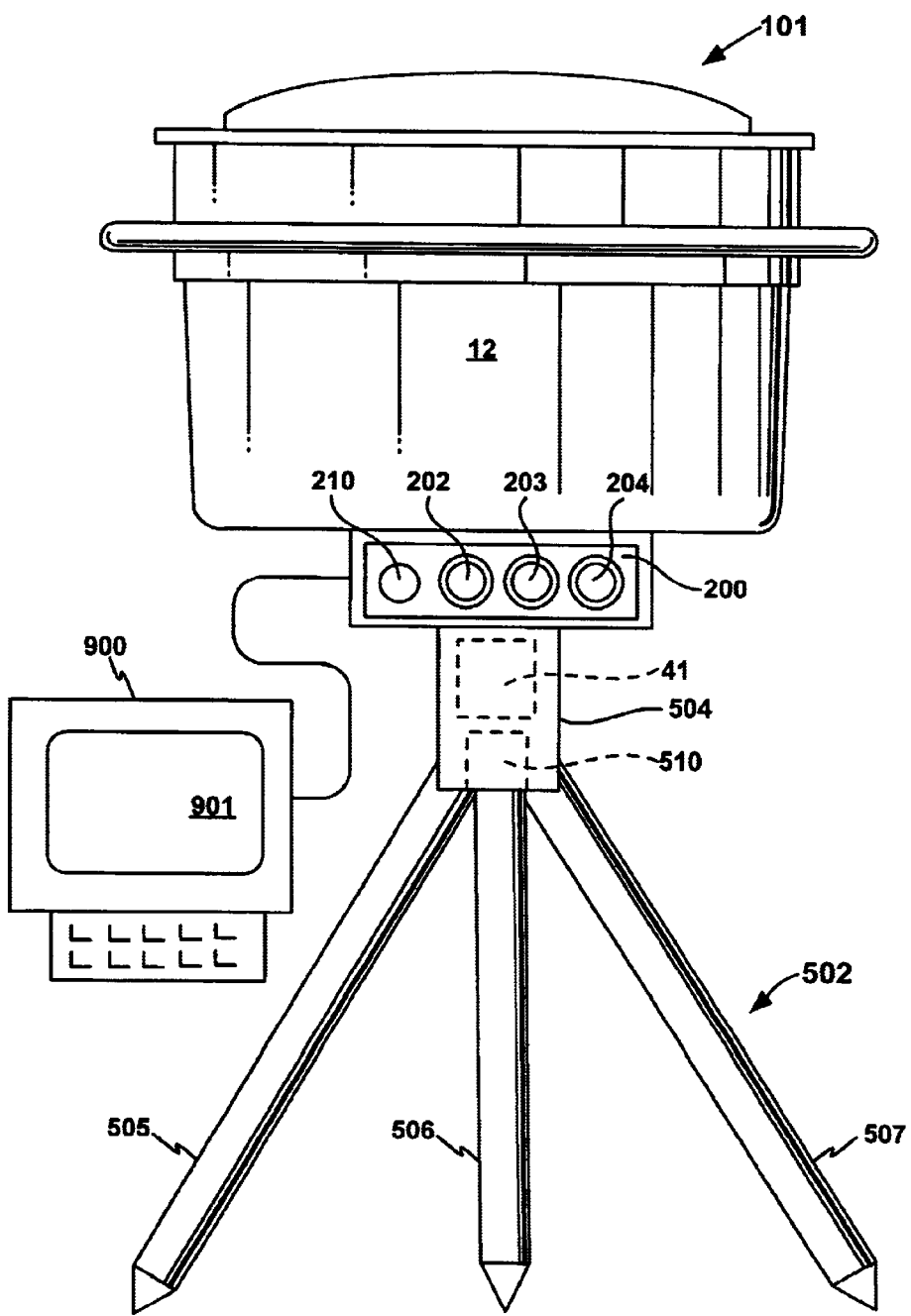
FIG. 6 is perspective view of a GPS unit mounted onto a tripod in accordance with a second embodiment of the present invention.

FIG. 6 shows a second embodiment which includes a tripod base 502. GPS unit 101 is identical to GPS unit 101 shown in the first embodiment and illustrated in FIGS. 1–5. Tripod base 502 is interchangeable with pole 102 shown in the first embodiment and it attaches to housing 12 in the same manner as does pole 102 of the first embodiment. Tripod 502 includes top section 504 to which leg 505, leg 506 and leg 507 are attached. Finder 510 allows GPS unit 101 to be precisely located over a landmark. Finder 510 may be a prismatic optical finder, a laser optical finder, a fixed height tripod, a laser finder with a fourth leg, or any of a number of other known location devices which are commonly used in construction and surveying equipment. Battery 41 is located within tripod 502. Though battery 41 is shown to be located within top section 504 of tripod 502, battery 41 could be located in or on any of legs 505–507. In fact, it may be desirable to locate battery 41 in legs 505–507 depending on the type of location equipment used as finder 510. Finder 510 could be used to precisely locate tripod 502 over a USGS marker such that the GPS unit would be able to function as a reference site such that the location of other GPS devices may be accurately determined by using DGPS techniques. The location and differential correction data may be monitored on display 901 of display unit 900. Since display unit 900 is a separate unit it may be connected and disconnected as needed.

Figure 7:
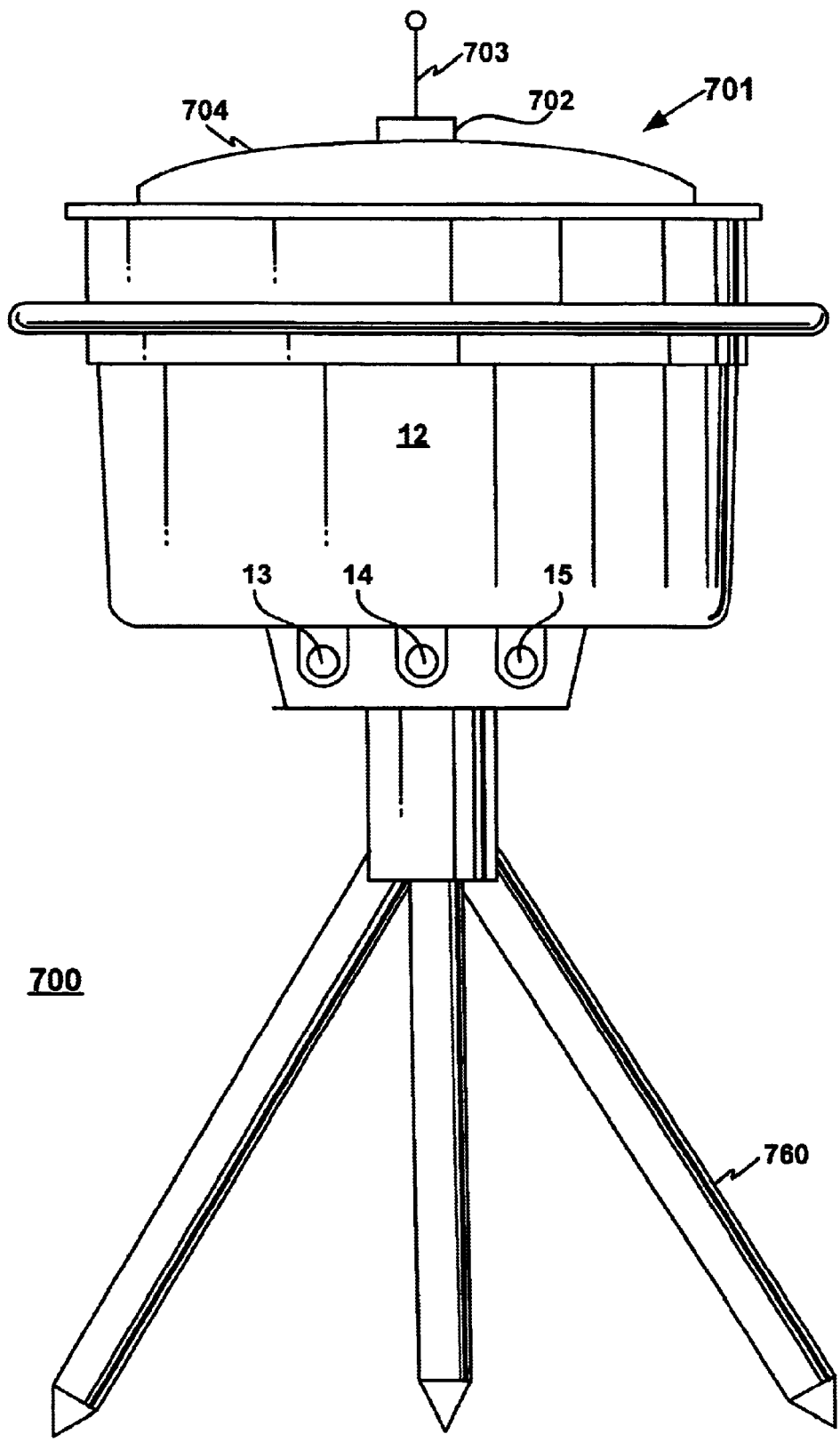
FIG. 7 is a perspective view of a radio unit mounted to a tripod in accordance with the present invention.

FIG. 7 shows a third embodiment which forms a radio relay. Radio relay system 700 incorporates many of the components disclosed in the first and second embodiments as shown in FIGS. 1–6. Radio relay system 700 includes radio relay unit 701 which is mounted on tripod 760. Radio relay unit 701 includes housing top 704 which has a circular opening into which removable transceiver unit 702 fits. Removable transceiver antenna 703 attaches to removable transceiver unit 702. Removable transceiver unit 702 can be easily removed from housing top 704. When removable transceiver unit 702 is removed from housing top 704, radio relay 701 operates at the 2.44 GigaHertz frequency. This allows for radio relay unit 701 to operate at any of a number of desired frequencies by simply inserting a removable transceiver unit 702 which operates at the desired frequency. Housing 12 and I/O ports 13–15 are identical to housing 12 and I/O ports 13–15 shown in the first and second embodiments. Though radio relay unit 701 is shown to be mounted onto tripod 760, radio relay unit 701 could be either attached to a pole such as pole 102 shown in the first embodiment or attached to a tripod such as tripod 502 shown in the second embodiment. Alternatively, radio relay unit 701 may be set on top of some structure or set on the ground and a power source may be attached to one of I/O ports 13–15.

Figure 8:
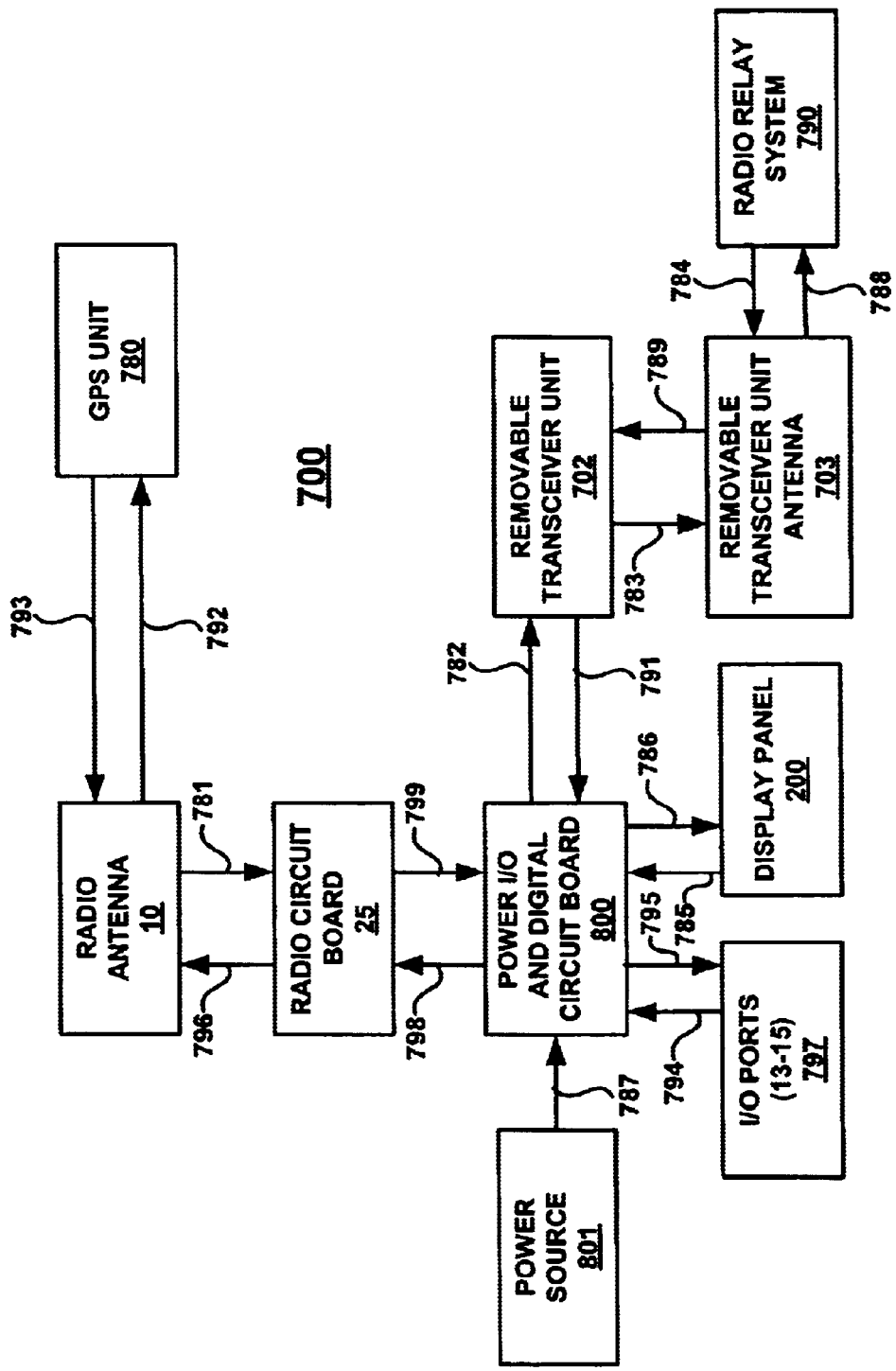
FIG. 8 is a diagram of a radio relay unit mounted to a tripod in accordance with a third embodiment of the present invention.

FIG. 8 shows radio relay system 700 to include radio antenna 10 which receives radio broadcasts from sources broadcasting at its frequency and transmits on the same frequency. Radio antenna 10 may receive signals from a GPS unit such as GPS unit 780 which may be located over a landmark having a known location. Signals received by radio antenna 10 such as signals from GPS unit 780, shown by arrow 793, are transmitted to radio circuit board 25 as shown by arrow 781. Radio circuit board 25 demodulates the signals and transmits the signals to power I/O and digital circuit board 800 as shown by arrow 799. When a removable transceiver unit 702 is plugged into radio relay system 700, the signals are transmitted to removable transceiver unit 702 as shown by arrow 782. Removable transceiver unit 702 broadcasts the signals at a higher frequency through removable transceiver unit antenna 703 as shown by arrow 783. This high frequency signal may be received by other radio relay systems such as radio relay system 790, as shown by arrow 788. When removable transceiver unit 702 is not plugged into radio relay system 700, radio relay system 700 operates as a relay at the frequency at which radio circuit board 25 and antenna 10 broadcast and receive. Display panel 200 includes an on/off switch which is coupled to power I/O and digital circuit board 800 as shown by arrows 785 and 786. Display panel 200 includes a number of lighted indicators which indicate the status and operation of relay system 700. Power is provided to radio relay system 700 by power source 801 as indicated by arrow 787. Power I/O and digital circuit board 800 also connects to I/O ports 13–15, as illustrated by arrows 794–795 and box 797, to which separate display units and input devices may be attached.

Continuing with FIG. 8, radio relay system 700 also operates by receiving signals at the frequency at which removable transceiver unit 702 operates. Thus signals may originate from other radio relay systems such as radio relay system 790 as shown by arrow 784. These signals are received by removable transceiver unit antenna 703 and are transmitted to removable transceiver unit 702 as shown by arrow 789. Removable transceiver unit 702 transmits the signals to power I/O and digital circuit board 800 as shown by arrow 791 which transmits the signals to radio circuit board 25 as shown by arrow 798 which broadcasts the signals through radio antenna 10 as shown by arrow 796.

The resulting radio broadcast may be received by GPS unit 780 as shown by arrow 792.

Figure 9:
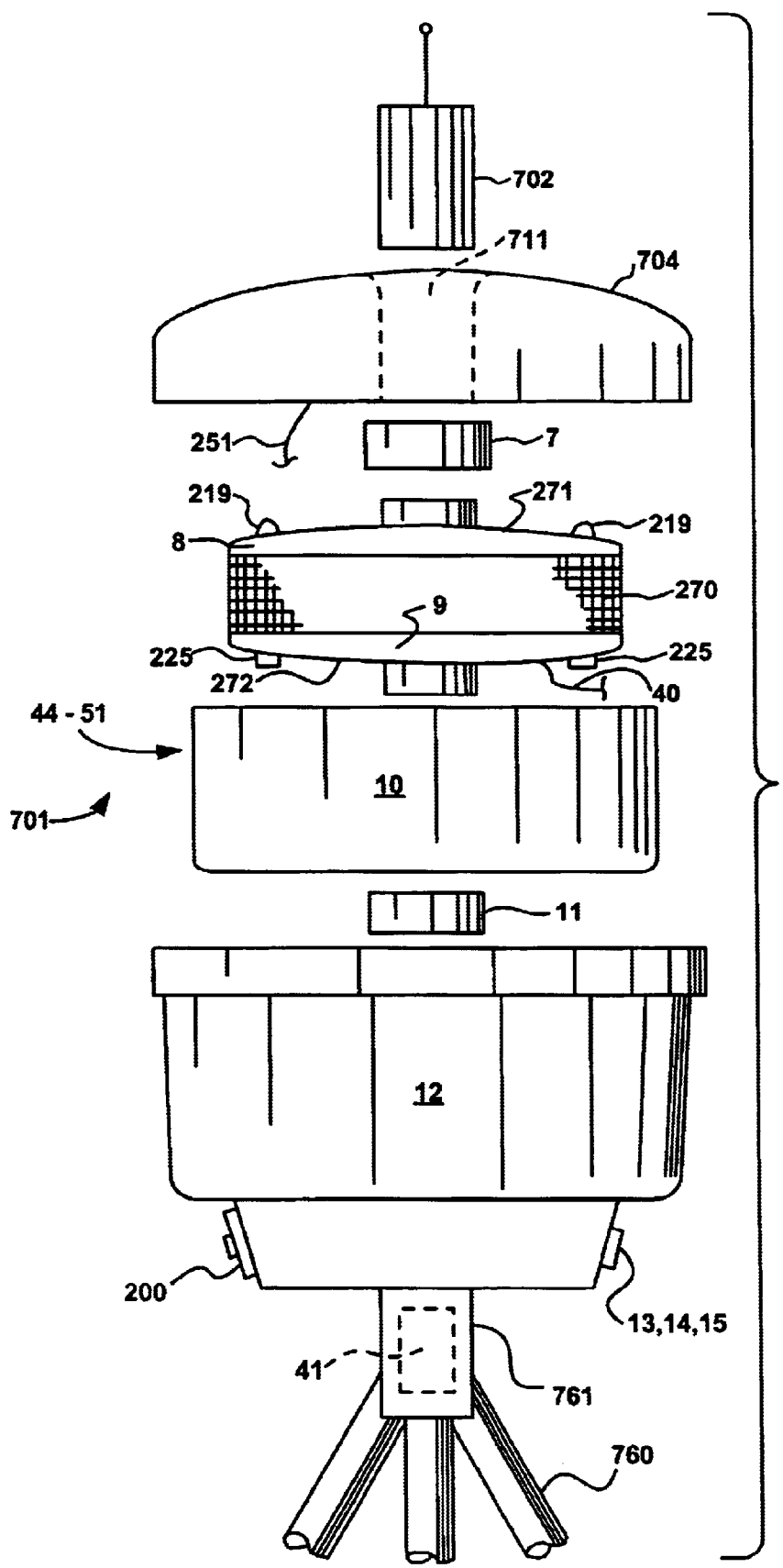
FIG. 9 is an exploded view of a radio relay unit mounted to a tripod in accordance with a third embodiment of the present invention.

FIG. 9 shows removable transceiver unit 702 to fit within receptacle opening 711 of housing top 704. Flexible bumper 7 is mounted above upper magnesium housing 8 and flexible bumper 11 is mounted below lower magnesium housing 9 so as to securely hold upper magnesium housing 8 and lower magnesium housing 9 within housing 12. Flexible bumper 7 and flexible bumper 11 absorb shock and vibration so as to protect the electronics located within upper magnesium housing 8 and lower magnesium housing 9. Flexible bumper 7, flexible bumper 11, lower magnesium housing 9 and upper magnesium housing 8 are identical to flexible bumper 7, flexible bumper 11, lower magnesium housing 9 and upper magnesium housing 8 shown in the first and second embodiments. In addition, housing 12 identical to housing 12 shown in the first two embodiments. Furthermore, metallic cloth 271–272 and metallic cloth strip 270 are identical to metallic cloth strip 270 and metallic cloth 271–272 shown in the first two embodiments. Power source 41 is identical to power source 41 shown in the first two embodiments and display panel 200 is identical to display panel 200 shown in the first two embodiments. In addition, I/O ports 13–15 are identical to I/O ports 13–15 shown in the first two embodiments of the present invention and they allow for coupling input and output between radio relay system 700 and other devices. Radio relay unit 701 is supported by tripod 760 which connects to radio relay unit 701 via screw threads 761. Power source 41 fits within tripod 760.

Figure 10:
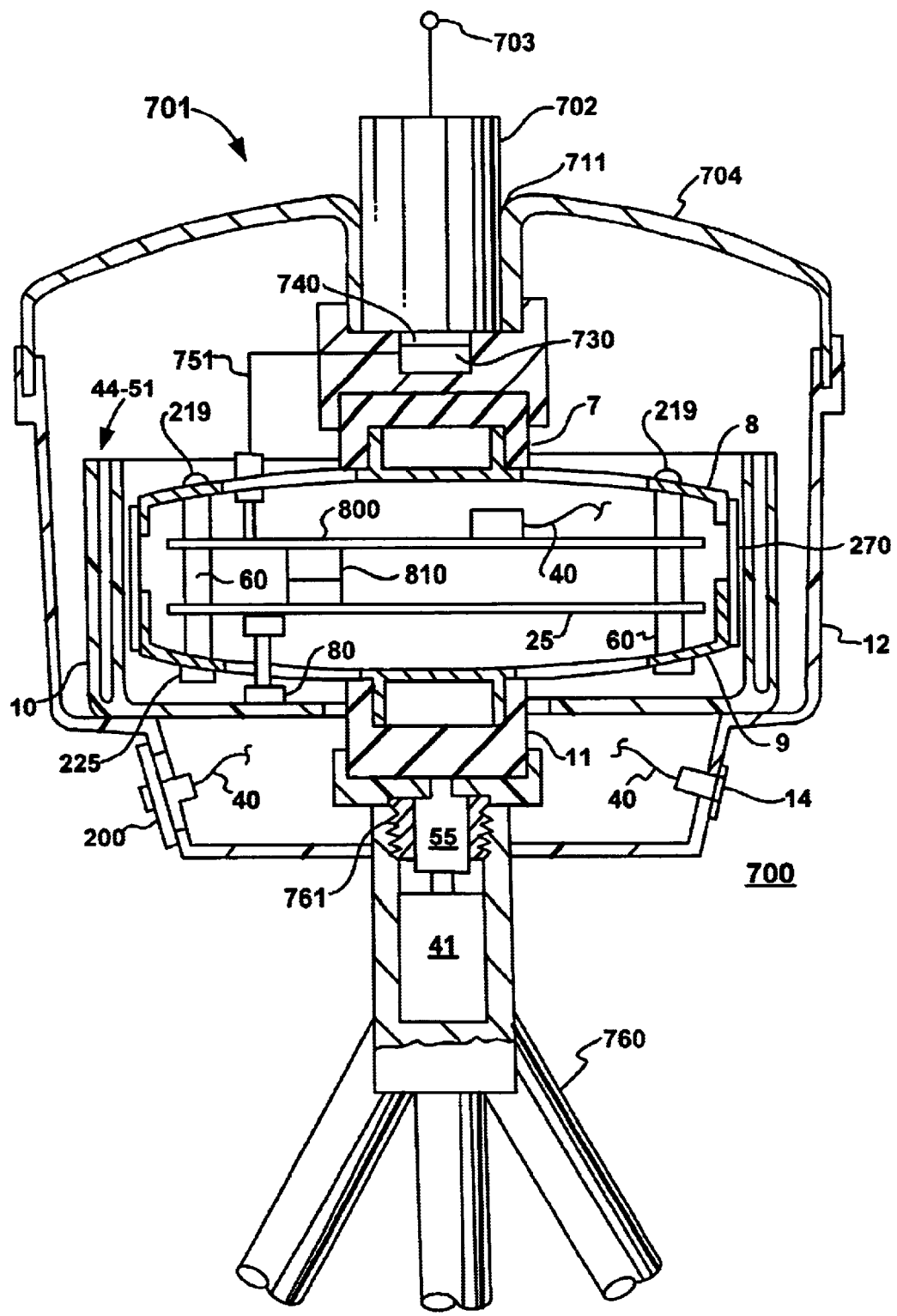
FIG. 10 is a cut-away side-sectional view of the radio relay system of FIG. 7 in accordance with the present invention.

FIG. 10 shows removable radio transceiver unit 702 to fit within opening 711 in housing top 704. Removable radio transceiver unit 702 includes connector 740 which mates with connector receptacle 730. Connector receptacle 730 is coupled to power I/O and digital circuit board 800 by cable 751. Power I/O and digital circuit board 800 is coupled to connector receptacles in I/O ports 13–15 (connector receptacles for I/O ports 13,15 are not shown), to display/control panel 200, and to power source coupling 55. Power I/O and digital circuit board 800 couples to radio circuit board 25 via connector 810. Radio circuit board 25 is coupled to antenna 10 which includes a parallel feed network and antennas 44–51 (46–51 are not shown) via receptacle 80 which is secured to antenna 10. Power source coupling 55 is identical to power source coupling 55 shown in the first and second embodiments and allows power to be coupled from battery 41 to power I/O and digital circuit board 800. Battery 41 is contained within tripod 760. Tripod 760 is identical to tripod 502 shown in the second embodiment of the present invention except that tripod 760 does not include finder 510. Cable 40 connects power source coupling 55, display board 200, and I/O ports 13–15 to power I/O and digital circuit board 800. Radio transceiver 702 operates at 900 MegaHertz. However, any of a number of different frequencies may be used. Different frequencies may be easily obtained by using removable transceiver units operating at various different frequencies and inserting removable transceiver units operating at the desired frequency as dictated by the situation. Thus, a repeater operating at a different frequency may be easily obtained by replacing transceiver 800 with a transceiver operating at the desired frequency. Signals to and from antenna 10 are broadcast at 2.44 GigaHertz, however any of a number of other frequencies could also be used.

Figure 11:
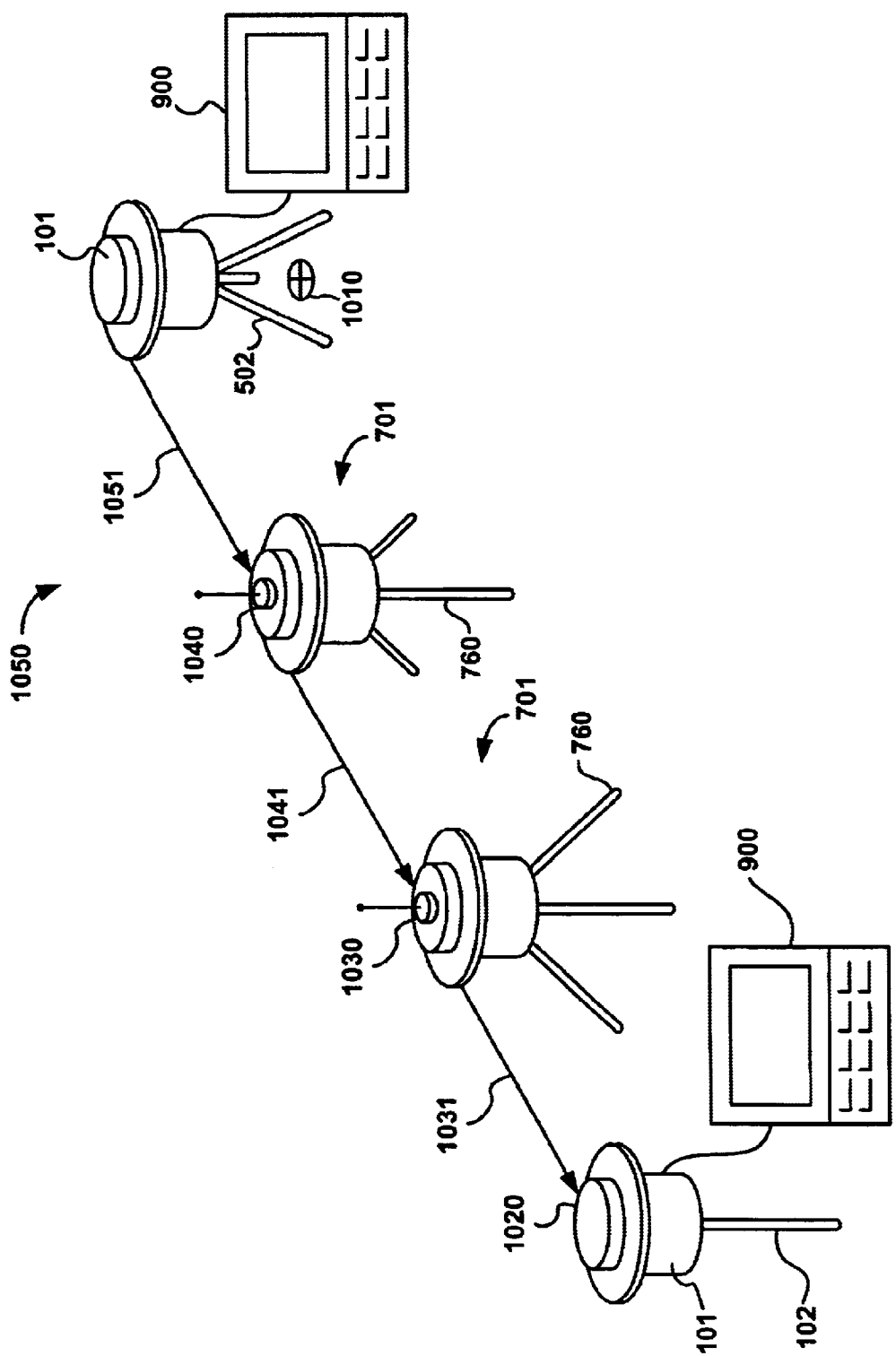
FIG. 11 is a schematic view of a network which incorporates the first embodiment and the second embodiment and the third embodiment in accordance with the present invention.

There are many different combinations of the various components shown in the present invention. FIG. 11 shows an example of one of those combinations. GPS system 1050 which includes GPS unit 101 is located over a known location 1010 such as a USGS survey site. Tripod 502 includes an optical location finder which is used to precisely locate GPS system 1050 over the known location 1010. Correction information are broadcast from GPS system 1050, as shown by arrow 1051 are received by radio relay 1040 at a frequency of 2.44 GigaHertz. Radio relay 1040 relays the signals to radio relay 1030 at 900 MegaHertz as shown by arrow 1041. The signals received by relay 1030 are then transmitted at 2.44 GigaHertz to GPS system 1020 as shown by arrow 1031. GPS system 1020 includes GPS unit 101 and pole 102. Using the correction information and telemetry data obtained from satellites, the location of GPS system 1020 may be accurately determined. Connected to GPS unit 101 of GPS system 1020 is display unit 900 which can be used to monitor the position of GPS system 1020 in order to exactly locate a desired position. Since radio relay 1020 and radio relay 1030 may also operate at 2.44 GigaHertz, a single radio relay, or both radio relay 1030 and radio relay 1040 could be used and operated at the 2.44 GigaHertz frequency, depending on the requirements of the particular location.

Though the GPS system of the present invention is described with reference to dual frequency operation, the present invention is also well suited for operation in a single frequency operating system. In addition, though the present invention is described with reference to the use of transceivers, transmitters, receivers, or transceivers could also be used depending on the requirements of the particular situation. For example, GPS unit 1050 of FIG. 11 could be receive only. In such an embodiment, a smaller, more simply designed radio antenna may be used and simplified radio processing circuitry could be used. For example a simple dipole antenna may be used in place of the complex structure of antenna 10. Alternatively, separate radio antennas may be used for transmitting and receiving, depending on the needs of the particular location. Radios may transmit and/or receive at any of a number of frequencies. In one embodiment, radios operate at frequencies allowed by, and under the requirements of Federal Communication Commission Part 9 and Part 2 regulations.

Figure 12:
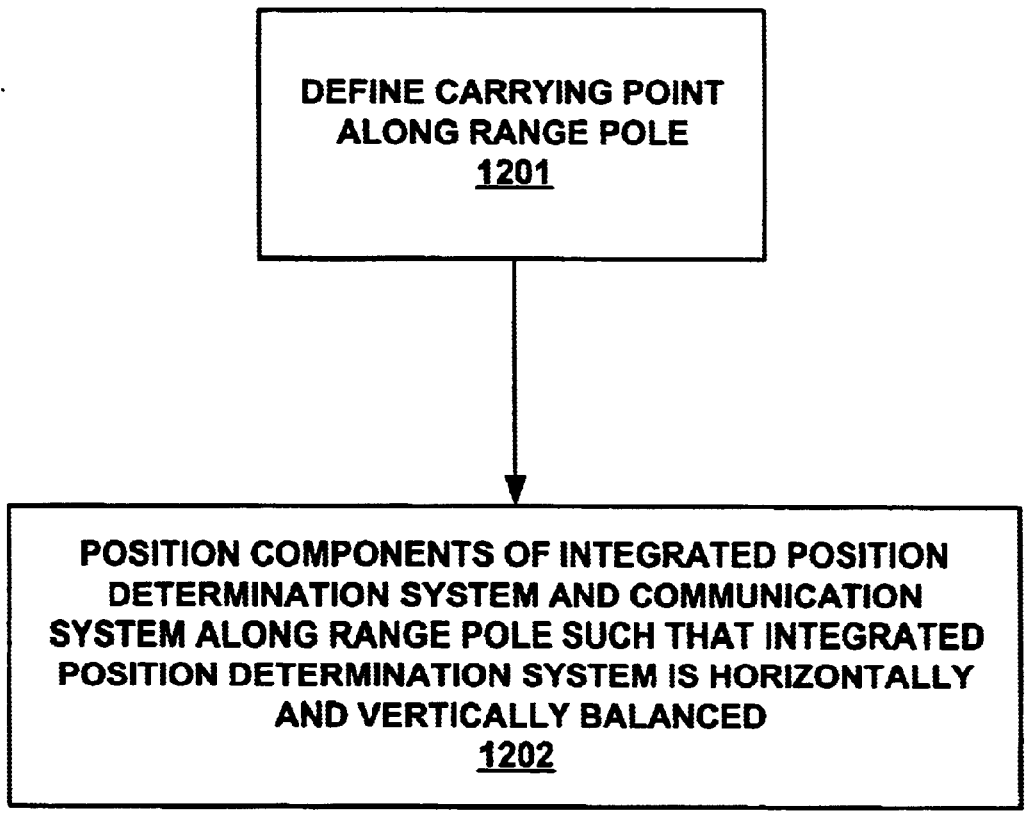
FIG. 12 is a flow chart illustrating a method for forming a balanced integrated position determination system and communication system in accordance with one embodiment of the present invention.

In one embodiment, one or more of I/O ports 13–15 are adapted for connection to an external radio such as external radios 1201–1204 of FIG. 12. The operating characteristics of external radios 1201–1204 are selected to fit the needs of the particular operating situation. For example, in different countries and in different regions of the US, communication is at different power levels and at different frequencies. Thus, a radio transmitting at, receiving at, or transmitting and receiving at a desired frequency and at a desired power level may be used as required by the particular situation. When dual frequency operation is required, multiple external radios may be coupled to I/O ports of the GPS unit which operate at different frequencies as required by the location. For example, one radio may be used to receive signals and a second radio may be used for transmission.

FIG. 12 shows a method for forming an integrated position determination system and radio system that is easy to carry. First, as shown by step 1201 a carrying point is defined along a range pole. In the present embodiment, the carrying point is defined within a gripping region of the pole. This gripping region is the location where the user grips the pole. In the present embodiment, the gripping region is positioned such that an average height user can comfortably grip the pole.

Figure 13:
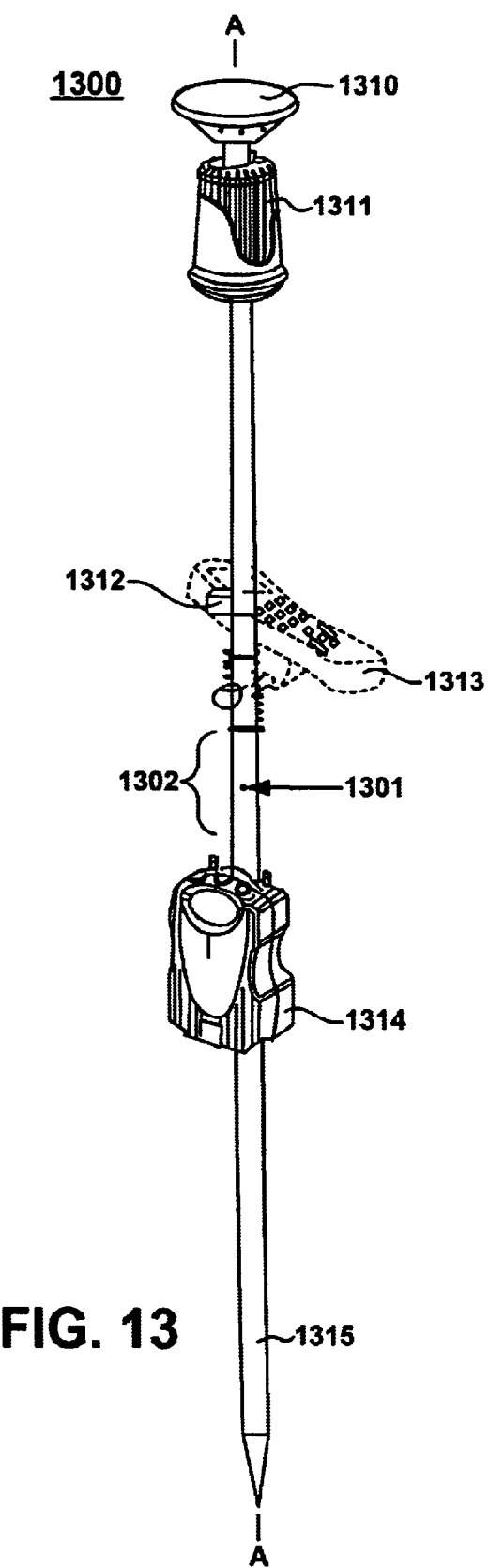
FIG. 13 is a upper right front perspective view of a balanced integrated position determination system and communication system in accordance with the present invention.
Figure 14:
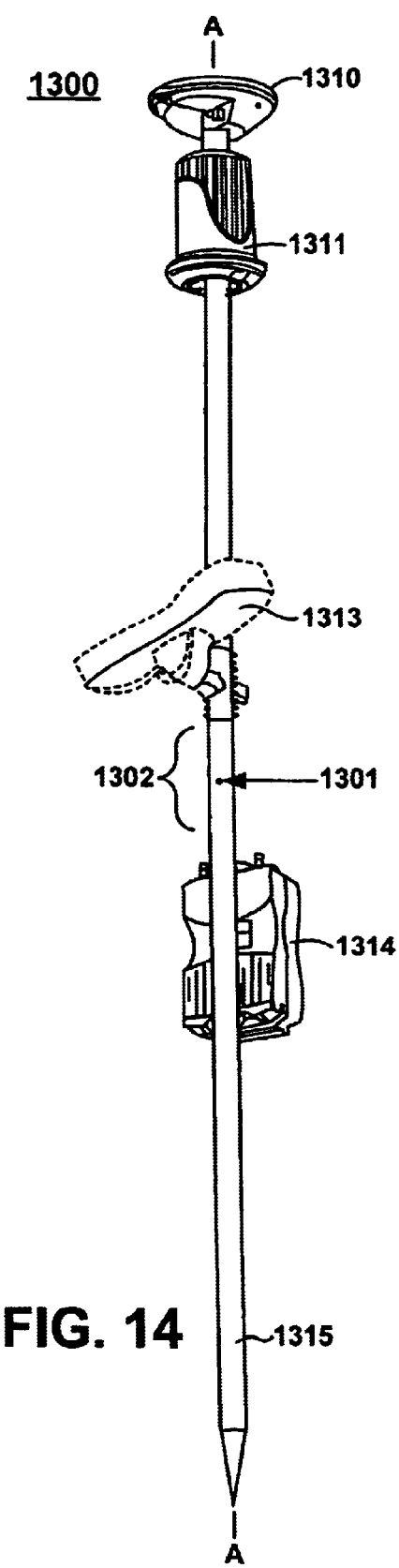
FIG. 14 is lower left rear perspective view of a balanced integrated position determination system and communication system in accordance with the present invention.
Figure 18:
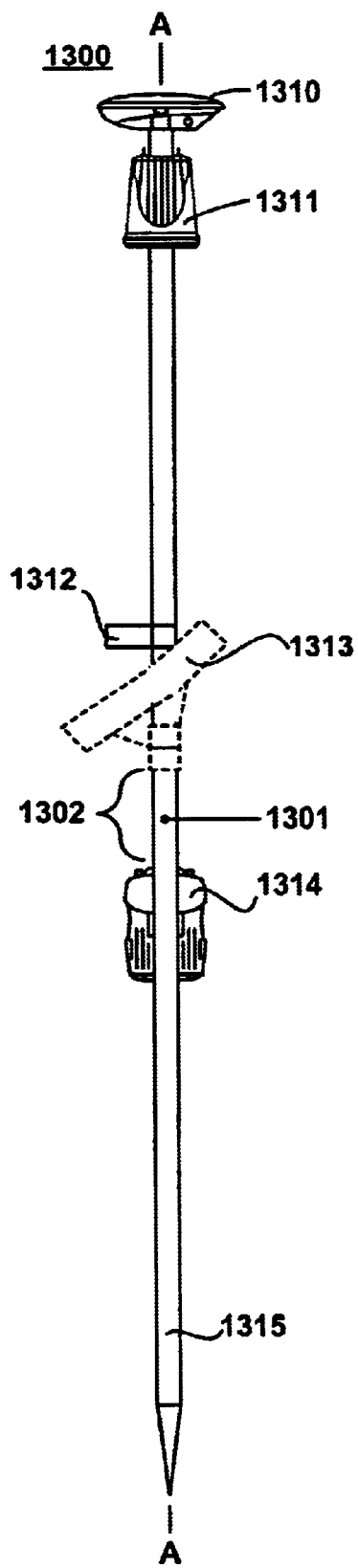
FIG. 18 is a rear elevational view of a balanced integrated position determination system and communication system in accordance with the present invention.
Figure 19:
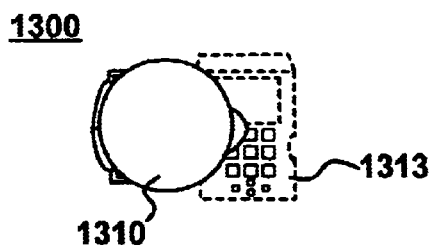
FIG. 19 is a top plan view of a balanced integrated position determination system and communication system in accordance with the present invention.
Figure 20:
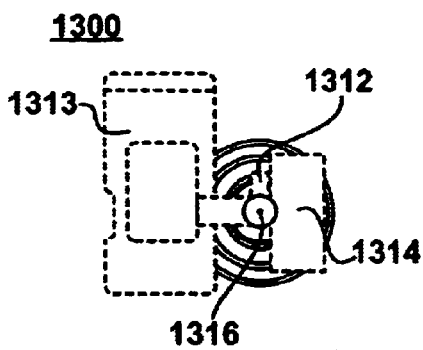
FIG. 20 is a bottom plan view of a balanced integrated position determination system and communication system in accordance with the present invention.

In the embodiment shown in FIG. 13, a 6 foot range pole is used and carrying point 1301 is located three feet from the top of the pole. It can be seen that carrying point 1301 is within gripping region 1302. In the present embodiment, components 1313 and 1314 are positioned so as to form a natural and relatively narrow gripping region 1302 therebetween. Alternatively, a gripping region could be indicated by a handgrip (not shown) that fits over the range pole or other indicia visible to a user that indicates where the pole is to be grasped.

Continuing with FIG. 12, as shown by step 1202, the components of the integrated position determination system and communication system are positioned along the range pole such that the integrated position determination system and communication system is horizontally and vertically balanced. In the present embodiment, horizontal balance is obtained by positioning the components of the integrated position determination system and communication system such that the components are balanced about the centerline of the range pole. Vertical balance is obtained by balancing the components vertically about the carrying point.

Continuing with step 1202, by vertically balancing the components about the carrying point, an integrated position determination system and communication system is obtained that does not tend to tip in any given direction when held. This facilitates holding the pole while moving into position to make a measurement and facilitates carrying the range pole. In one embodiment of the present invention, all of the components are balanced about the carrying point such that there is a zero vertical moment at the carrying point. Alternatively, the components are balanced so as to minimize the vertical moment at the carrying point. By vertically balancing the components about the carrying point, the tendency of the system to tip over is reduced, thereby reducing muscle fatigue and potential damage due to tipping over as commonly occurs with prior art systems.

Vertical balance is obtained by balancing the components of the integrated position determination system and communication system about the carrying point. Any of a number of different methods can be used to balance the components of an integrated position determination system and communication system about a carrying point. In one embodiment, some of the components of the integrated position determination system and communication system are placed within separate housings which are separately coupled to the range pole. In the present embodiment, only those components that are required to be positioned at or near the top of the pole are kept at or near the top of the pole. All other components are located lower along the pole to give the required balance.

Referring now to FIGS. 13–20, an integrated position determination system and communication system 1300 is shown that includes a GPS antenna 1310 and a radio antenna 1311 that are located in separate housings. GPS antenna 1310 and radio antenna 1311 are positioned near the top of the pole. All other components are moved down the pole to balance the system about the carrying point. In the present embodiment, the integrated position determination system and communication system 1300 includes receiver 1314 that includes a housing that contains position determination system processing circuitry including a GPS receiver and a GPS processor. Additionally, radio signal processing circuitry and a power supply (e.g., a battery) is contained within receiver 1314.

Continuing with FIGS. 13–20, in the present embodiment, the radio signal processing circuitry contained within receiver 1314 includes a radio data transmitter (also referred to as a radio modem) that transmits data in serial form digitally at a frequency of 450 MegaHertz. In an alternate embodiment, the radio signal processing circuitry contained within receiver 1314 operates at a frequency of 900 MegaHertz. However, other frequencies could also be used.

Continuing with FIGS. 13–20, system 1300 also includes data logger 1313. In the present embodiment, data logger 1313 is coupled via cable (not shown) to receiver 1314. Data logger 1313 includes an alphanumeric keypad and a display for coupling information to and from a user. That is a user provides input via data logger 1313 and receives output that is displayed on the display of data logger 1313.

In the present embodiment, cables (not shown) couple GPS antenna 1310 to receiver 1314 and couple communications antenna 1311 to receiver 1314. Similarly, a cable (not shown) is used to couple data logger 1313 to receiver 1314.

In one embodiment, the integrated position determination system and communication system 1300 of FIGS. 13–20 is vertically balanced by locating a GPS antenna 1310 that weighs 1 pound at the top of range pole 1315 (three feet above carrying point 1301) and locating communications antenna 1311 that weighs 1 pound such that the center of gravity of the communications antenna is at a distance of 2.5 feet above carrying point 1301. In this embodiment, data logger 1313 that weighs one pound is located 0.5 feet above carrying point 1301 and receiver 1314 which weighs 3.5 pounds is located 1.857 feet below carrying point 1301. In the present embodiment, level 1312 has minimal weight and does not contribute significantly to the vertical moment. This gives a total vertical moment about carrying point 1301 of zero. That is, GPS antenna 1310 contributes 3 foot-pounds (1 pound * 3 feet), communications antenna 1311 contributes 2.5 foot-pounds (1 pound * 2.5 feet), data logger 1313 contributes 1 foot-pound (2 pounds * 0.5 feet) for a total of 6.5 foot-pounds. This is balanced out by locating receiver 1314 at a distance 1.857 feet below carrying point 1301 to produce a vertical moment of zero footpounds (6.5–3.5 * 1.857). Because the vertical moment of integrated position determination system and communication system 1300 of FIGS. 13–20 is zero foot-pounds at carrying point 1301, good handling characteristics are obtained, thereby reducing muscle fatigue and potential damage due to tipping over as commonly occurs with prior art systems.

Referring back to step 1202 of FIG. 12, by horizontally balancing the components about the centerline of the range pole, an integrated position determination system and communication system is obtained that does not tend to tip in any given direction when held upright. This facilitates holding the pole in position to make a measurement. In one embodiment of the present invention, all of the components are balanced about the centerline such that there is a zero horizontal moment at the centerline. Alternatively, the components are balanced so as to minimize the horizontal moment at the centerline. Preferably, the moment at the centerline is held to less than or equal to 3 inch-pounds. In one embodiment, the components are balanced to obtain a horizontal moment of 2.25 inch-pounds or less about the centerline. It has been found that a moment of 2.25 inch-pounds or less gives good handling characteristics, thereby reducing muscle fatigue and potential damage due to tipping over as commonly occurs with prior art systems.

In the embodiment shown in FIGS. 13–20, horizontal balance is obtained by locating each of components 1310–1314 as close to the centerline of range pole 1315 as possible. In this embodiment, components 1310–1311 are centered about the centerline of the range pole 1315. Each of components 1312–1314 have centers of gravity that are located at a distance from centerline A—A of range pole 1315. Therefore, components 1312–1314 must be positioned relative to centerline A—A so as to balance-out.

In one embodiment, data logger 1313 of FIGS. 13–20 has a weight of 2 pounds centered 3.75 inches from centerline A—A. Receiver 1314 has a weight of 3.5 pounds centered 1.5 inches from centerline A—A. In the present embodiment, level 1312 has minimal weight and does not contribute significantly to the horizontal moment. Because data logger 1313 is positioned opposite component 1314, a total horizontal moment of 2.25 inch-pounds is obtained (2 pounds * 3.75 inches–3.5 pounds * 1.5 inches). Because the horizontal moment of integrated position determination system and communication system 1300 of FIGS. 13–20 is 2.25 inch-pounds relative to centerline A—A, good handling characteristics are obtained, thereby reducing muscle fatigue and potential damage due to tipping over as commonly occurs with prior art systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An integrated position determination system and communication system comprising:
    a position determination system antenna coupled to a pole having a carrying point and a centerline;
    position signal processing circuitry coupled to said pole and electrically coupled to said position determination system antenna, said position signal processing circuitry for analyzing position determining signals to determine position;
    a communications antenna coupled to said pole;
    radio signal processing circuitry coupled to said pole and electrically coupled to said communications antenna; and
    a power supply coupled to said pole, said power supply electrically coupled to said position signal processing circuitry and electrically coupled to said radio signal processing circuitry, wherein said position determination system antenna, said position signal processing circuitry, said communications antenna, said radio signal processing circuitry, and said power supply are vertically balanced about said carrying point to minimize the vertical moment at said carrying point and are also horizontally balanced about said centerline to minimize the horizontal moment at said centerline.

2. The integrated position determination system and communication system of claim 1 further comprising a first housing coupled to the top of said pole, said position determination system antenna disposed in said first housing.

3. The integrated position determination system and communication system of claim 2 further comprising:
    a second housing disposed proximate said top of said pole, said communications antenna disposed in said second housing.

4. The integrated position determination system and communication system of claim 3 further comprising:
    a third housing coupled to said pole below said carrying point, said position signal processing circuitry, said radio signal processing circuitry and said power supply disposed in said third housing.

5. The integrated position determination system and communication system of claim 1 wherein said position determination system antenna, said position signal processing circuitry, said communications antenna, said radio signal processing circuitry, and said power supply are horizontally balanced about said centerline by locating each of them as close to said centerline of said pole as possible.

6. The integrated position determination system and communication system of claim 1 wherein said pole has a centerline and wherein said position determination system antenna, said position signal processing circuitry, said communications antenna, said radio signal processing circuitry, and said power supply have a horizontal moment of less than three inch-pounds at said centerline.

7. An integrated position determination system and communication system comprising:
    a pole having a carrying point and a centerline;
    an antenna for receiving signals from satellites, said antenna disposed in a first housing that is coupled to said pole;
    position signal processing circuitry coupled to said antenna and for analyzing position determining signals for determining position;
    a radio for communicating with other position determination systems, said radio including a communication antenna and including radio signal processing circuitry; and
    a power supply for providing power, wherein said position signal processing circuitry, said radio, said first housing, and said power supply positioned along said pole to be vertically balanced about said carrying point to minimize the vertical moment at said carrying point and also to be horizontally balanced about said centerline to minimize the horizontal moment at said centerline.

8. The integrated position determination system and communication system of claim 7 wherein said radio transmits and receives correction data for more accurately determining position.

9. The integrated position determination system and communication system of claim 7 further comprising:
    a second housing disposed proximate said top of said pole, said communications antenna disposed in said second housing.

10. The integrated position determination system and communication system of claim 9 further comprising:
    a third housing coupled to said pole below said carrying point.

11. The integrated position determination system and communication system of claim 10 wherein said radio signal processing circuitry and said battery are disposed in said third housing.

12. The integrated position determination system and communication system of claim 11 wherein said position signal processing circuitry is disposed in said third housing.

13. The integrated position determination system and communication system of claim 12 further comprising a data logger, said data logger including a data input device and including a display, said data logger coupled to said pole above said carrying point, said data logger, said position signal processing circuitry, said radio, and said power supply positioned along said pole so as to vertically balance said pole about said carrying point.

14. The integrated position determination system and communication system of claim 13 further comprising a level device.

15. The integrated position determination system and communication system of claim 13 wherein said data logger is positioned immediately above said carrying point and wherein said third housing is positioned immediately below said carrying point so as to define a gripping region therebetween.

16. The integrated position determination system and communication system of claim 7 wherein said first housing, said position signal processing circuitry, said radio, and said power supply are horizontally balanced about said centerline by locating each of them as close to said centerline of said pole as possible.

17. The integrated position determination system and communication system of claim 7 wherein said pole has a centerline and wherein said first housing, said position signal processing circuitry, said radio, and said power supply have a horizontal moment of less than three inch-pounds at said centerline.

18. A method for forming an integrated position determination system and communication system that includes a plurality of components and that is easy to carry, said method comprising:

a) utilizing a pole having a centerline;
   b) defining a carrying point along said pole; and
   c) positioning said plurality of components along said pole so as to vertically balance said integrated position determination system and communication system about said carrying point to minimize the vertical moment at said carrying point and to horizontally balance said integrated position determination system and communication system about said centerline of said pole to minimize the horizontal moment at said centerline.

19. The method of claim 18 wherein c) further comprises locating each of said plurality of components as close to said centerline of said pole as possible to horizontally balance said integrated position determination system and communication system about the centerline of said pole.

20. The method of claim 18 wherein c) further comprises:

c1) positioning a GPS antenna proximate the top of said pole;
   c2) positioning a communications antenna proximate said top of said pole;
   c3) positioning position signal processing circuitry along said pole such that said radio signal processing circuitry is disposed below said carrying point, said position signal processing circuitry electrically coupled to said GPS antenna;
   c4) positioning radio signal processing circuitry along said pole such that said radio signal processing circuitry is disposed below said carrying point, said radio signal processing circuitry electrically coupled to said communications antenna;
   c5) positioning a power supply along said pole such that said power supply is disposed below said carrying point; and
   c6) wherein said GPS antenna, said communications antenna, said position signal processing circuitry, said radio signal processing circuitry and at least one battery are positioned along said pole so as to distribute weight along said pole so as to vertically balance said integrated position determination system and communication system about said carrying point.

21. The method of claim 20 further comprising:

c7) positioning a data logger along said pole such that said data logger is disposed above said carrying point, said data logger electrically coupled to said position signal processing circuitry; and
   c8) positioning a level device along said pole.

* * * * *